(12) United States Patent
Qin et al.

(10) Patent No.: US 10,983,630 B2
(45) Date of Patent: Apr. 20, 2021

(54) TOUCH ARRAY BASEPLATE AND MANUFACTURING METHOD THEREOF, TOUCH PANEL COMPRISING THE SAME

(71) Applicants: ORDOS YUANSHENG OPTOELECTRONICS CO., LTD., Inner Mongolia (CN); BOE TECHNOLOGY GROUP CO., LTD, Beijing (CN)

(72) Inventors: Wenwen Qin, Beijing (CN); Jian Sun, Beijing (CN); Yun Qiao, Beijing (CN); Xiaozhou Zhan, Beijing (CN); Han Zhang, Beijing (CN); Zhen Wang, Beijing (CN); Lele Cong, Beijing (CN); Zhengkui Wang, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/642,007

(22) PCT Filed: May 31, 2019

(86) PCT No.: PCT/CN2019/089454
§ 371 (c)(1),
(2) Date: Feb. 25, 2020

(87) PCT Pub. No.: WO2019/228490
PCT Pub. Date: Dec. 5, 2019

(65) Prior Publication Data
US 2020/0241723 A1    Jul. 30, 2020

(30) Foreign Application Priority Data
May 31, 2018 (CN) .......................... 201810548500.7

(51) Int. Cl.
*G06F 3/041* (2006.01)

(52) U.S. Cl.
CPC ........ *G06F 3/04164* (2019.05); *G06F 3/0412* (2013.01); *G06F 2203/04103* (2013.01)

(58) Field of Classification Search
CPC .............................................. G06F 3/041–047
See application file for complete search history.

(56) References Cited

U.S. PATENT DOCUMENTS

2014/0132560 A1    5/2014    Huang et al.
2016/0209942 A1*   7/2016    Yang .................. G06F 3/0412
(Continued)

FOREIGN PATENT DOCUMENTS

CN    205353991 U    6/2016
CN    205375439 U    7/2016
(Continued)

OTHER PUBLICATIONS

International Search Report received for PCT Patent Application No. PCT/CN2019/089454, dated Aug. 28, 2019, 5 pages (2 pages of English Translation and 3 pages of Original Document).
(Continued)

*Primary Examiner* — Roy P Rabindranath
(74) *Attorney, Agent, or Firm* — Womble Bond Dickinson (US) LLP

(57) ABSTRACT

A touch array baseplate panel, including a substrate and a film layer structure. The film layer structure includes: a touch electrode layer, including a plurality of touch electrodes arranged in an array; a first electrically conductive layer, including a plurality of touch electrode lines and virtual touch electrode lines; a second electrically conductive layer, including connection lines. A touch electrode line is electrically connected to a corresponding touch electrode through a first via hole, and a virtual touch electrode line is
(Continued)

electrically connected to a corresponding touch electrode through a second via hole, and a connection line electrically connects, through third via holes, a touch electrode line and a virtual touch electrode line electrically connected to a same touch electrode. This disclosure further provides a method for manufacturing the touch array baseplate panel and a touch panel including the touch array baseplate panel.

20 Claims, 6 Drawing Sheets

(56) References Cited

U.S. PATENT DOCUMENTS

| | | | |
|---|---|---|---|
| 2017/0090635 | A1 | 3/2017 | Kim et al. |
| 2018/0373104 | A1* | 12/2018 | Qin ................ G06F 3/0416 |
| 2020/0241723 | A1 | 7/2020 | Qin et al. |

FOREIGN PATENT DOCUMENTS

| | | |
|---|---|---|
| CN | 106371661 A | 2/2017 |
| CN | 107025012 A | 8/2017 |
| CN | 107272966 A | 10/2017 |
| CN | 107861658 A | 3/2018 |
| CN | 108776551 A | 11/2018 |

OTHER PUBLICATIONS

Office Action received for Chinese Patent Application No. 201810548500.7, dated Mar. 6, 2020, 14 pages (9 pages of English Translation and 5 pages of Office Action).

Office Action received for Chinese Patent Application No. 201810548500.7, dated May 7, 2020, 13 pages (9 pages of English Translation and 4 pages of Office Action).

Office Action received for Chinese Patent Application No. 201810548500.7, dated Nov. 25, 2019, 14 pages (7 pages of English Translation and 7 pages of Office Action).

Office Action received for Chinese Patent Application No. 201810548500.7, dated Sep. 14, 2020, 17 pages (9 pages of English Translation and 8 pages of Office Action).

* cited by examiner

A-A

TOUCH ARRAY BASEPLATE AND MANUFACTURING METHOD THEREOF, TOUCH PANEL COMPRISING THE SAME

CROSS REFERENCE TO RELATED APPLICATION

The present application is a 35 U.S.C. 371 national stage application of PCT International Application No. PCT/CN2019/089454, filed on May 31, 2019, which claims the benefit of Chinese Patent Application No. 201810548500.7, filed on May 31, 2018, the entire disclosures of which are incorporated herein by reference.

FIELD OF THE INVENTION

This disclosure relates to the field of display technologies, and in particular to a touch array baseplate and a manufacturing method thereof, as well as a touch panel comprising the touch array baseplate.

BACKGROUND ART

With the rapid development of display technologies, the appearance of touch panels (TP for short) has brought more convenience to our life. Nowadays, in-cell capacitive touch technologies have been widely applied in the field of display. In particular Full In Cell (FIC for short) touch panels, due to their high integration, light weight, thin thickness and low cost, have gradually become the mainstream technology of in-cell capacitive touch products.

However, for regions having a round corner (i.e., an R corner) in a touch panel, or for special-shaped position regions of a special-shaped touch panel, as being spatially limited, these regions may have quite few via holes electrically connected to touch electrodes, which increases the touch load and thus leads to touch and/or display defects. Besides, for some touch panels having a low resolution and a large pixel pitch, they may also have a high touch load, which in turn leads to touch and/or display defects.

SUMMARY

According to one aspect of this disclosure, a touch array baseplate is provided, comprising: a substrate; a film layer structure, formed on the substrate and comprising: a touch electrode layer, comprising a plurality of touch electrodes arranged in an array; a first electrically conductive layer, comprising: a plurality of touch electrode lines, the plurality of touch electrode lines corresponding to the plurality of touch electrodes one by one, and each touch electrode line being electrically connected to a corresponding touch electrode through a first via hole; a virtual touch electrode line connected to at least one of the plurality of touch electrodes, the virtual touch electrode line being electrically connected to a corresponding touch electrode through a second via hole, wherein the virtual touch electrode line is located within an orthogonal projection of the touch electrode connected thereto on the first electrically conductive layer; a second electrically conductive layer, comprising: connection lines, with a connection line electrically connecting through third via holes a touch electrode line and a virtual touch electrode line which are electrically connected to a same touch electrode, wherein the connection line is located within an orthogonal projection of a corresponding touch electrode on the second electrically conductive layer; wherein the touch electrode layer, the first electrically conductive layer and the second electrically conductive layer are isolated from each other by insulating layers.

According to some exemplary embodiments of this disclosure, the touch electrode lines and the virtual touch electrode line both extend in a first direction.

According to some exemplary embodiments of this disclosure, the connection lines extend in a second direction, and the second direction and the first direction intersect each other.

According to some exemplary embodiments of this disclosure, the first electrically conductive layer further comprises a plurality of data lines parallel with each other, and the data lines also extend in the first direction.

According to some exemplary embodiments of this disclosure, the second electrically conductive layer further comprises a plurality of gate lines parallel with each other, and the gate lines also extend in the second direction.

According to some exemplary embodiments of this disclosure, each connection line is arranged close to a gate line correspondingly.

According to some exemplary embodiments of this disclosure, the film layer structure further comprises a black matrix, and orthogonal projections of the connection lines on the substrate fall within an orthogonal projection of the black matrix on the substrate.

According to some exemplary embodiments of this disclosure, the touch electrode lines extend from one side of the touch array baseplate to the other side opposite thereto.

According to some exemplary embodiments of this disclosure, each of the plurality of touch electrodes is connected to at least one virtual touch electrode line.

According to some exemplary embodiments of this disclosure, for the plurality of touch electrodes, a difference between numbers of active via holes electrically connected to one touch electrode is smaller than or equal to a first threshold value, the active via holes being the first via holes connected to the touch electrode lines electrically connected to the touch electrode and the second via holes connected to the virtual touch electrode lines electrically connected to the touch electrode lines by means of the connection lines.

According to some exemplary embodiments of this disclosure, for the plurality of touch electrodes, the numbers of the active via holes electrically connected to one touch electrode are the same.

According to another aspect of this disclosure, a touch panel is provided, the touch panel comprising the above touch array baseplate.

According to some exemplary embodiments of this disclosure, the touch panel is a special-shaped panel or a touch panel having a resolution below 1080×1800.

According to yet another aspect of this disclosure, a manufacturing method for manufacturing the above touch array baseplate is provided, comprising the following steps:
a) forming the touch electrode layer in the film layer structure, and patterning the touch electrode layer to form the plurality of touch electrodes;
b) forming the first electrically conductive layer in the film layer structure, and patterning the first electrically conductive layer to form the plurality of touch electrode lines and the virtual touch electrode lines;
c) forming the first via holes electrically connecting the touch electrodes with the touch electrode lines, and forming the second via holes electrically connecting the touch electrodes with the virtual touch electrode lines;
d) forming the second electrically conductive layer in the film layer structure, and patterning the second electrically conductive layer to form the connection lines;

e) forming the third via holes electrically connecting the connection lines with the touch electrode lines and the virtual touch electrode lines.

According to some exemplary embodiments of this disclosure, step b) further comprises: patterning the first electrically conductive layer to form a plurality of data lines.

According to some exemplary embodiments of this disclosure, step d) further comprises: patterning the second electrically conductive layer to form a plurality of gate lines.

BRIEF DESCRIPTION OF DRAWINGS

The exemplary embodiments of this disclosure will be described in detail with reference to the drawings hereinafter, so as to provide better knowledge and understanding of the problems to be solved, the above and other objectives, features and advantages of this disclosure, and in the drawings.

Same or similar parts, components and/or elements are indicated by same reference signs throughout the drawings.

DETAILED DESCRIPTION OF EMBODIMENTS

Figure 1:
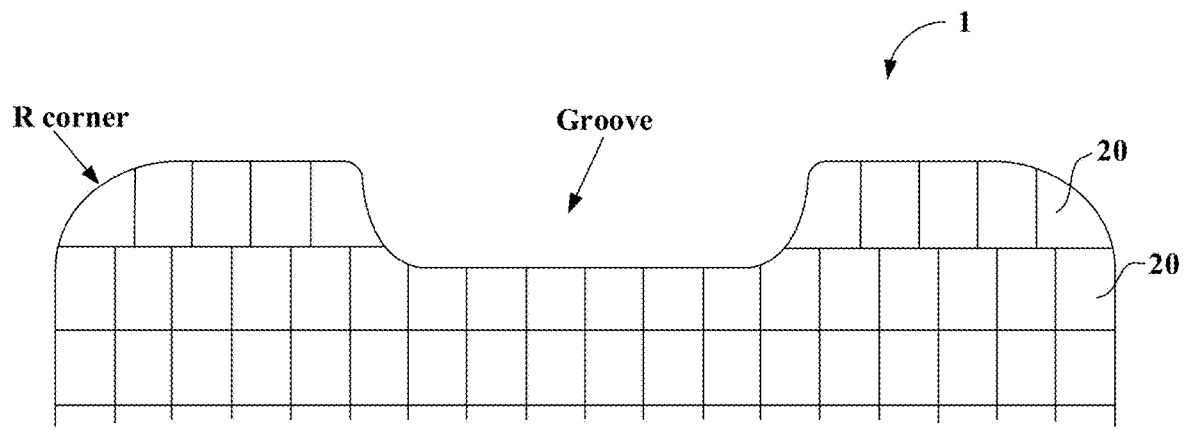
FIG. 1 schematically shows shapes of touch electrodes at different positions of a special-shaped touch array baseplate in the prior art.

The exemplary embodiments of this disclosure shall be described hereinafter in a clear and complete manner with reference to the drawings. Apparently, the described embodiments are only part of the embodiments of this disclosure, rather than all of them. Other embodiments obtainable by those having ordinary skills in the art without inventive efforts based on the described embodiments of this disclosure, shall all fall within the protection scope of the present disclosure.

It will be understood that although terms such as "first", "second", "third", etc. can be used to describe various elements, components and/or parts herein, these elements, components and/or parts should not be limited by these terms. These terms are only used to distinguish one element, component or part from another element, component or part. Therefore, the first element, component or part discussed below may also be called the second or third element, component or part without deviating from the teaching of this disclosure.

Terms used herein are only intended for describing a specified embodiment, rather than limiting the present disclosure. As used herein, singular forms like "a", "an" and "the" are also intended to include plural forms, unless explicitly indicated otherwise in the context. It should also be understood that when used in this specification, the term "include" and/or "comprise" refers to the presence of stated features, entities, steps, operations, elements and/or parts, but does not exclude the presence of one or more other features, entities, steps, operations, elements, parts and/or a group thereof or the addition of one or more other features, entities, steps, operations, elements, parts and/or a group thereof. Besides, the term "and/or" used herein comprises any and all combinations of one or more of listed items associated therewith.

It will be understood that when an element is described as "being connected to another element" or "being coupled to another element", it can be connected or coupled to another element directly, or by an intermediate element. On the contrary, when an element is described as "being directly connected to another element" or "being directly coupled to another element", there is no intermediate element.

Unless otherwise defined, all terms used herein (including both technical terms and scientific terms) have the same meanings as commonly understood by one having ordinary skills in the art to which the present disclosure pertains. It should also be understood that terms such as those defined in a common dictionary should be construed as having meanings consistent with their meanings in the related art and/or in the context of this specification, and they will not be construed in an ideal or overly formal sense, unless explicitly defined so herein.

It should be noted that in the descriptions of this specification, descriptions referring to expressions such as "one embodiment", "some embodiments", "exemplary embodiments", "specific examples", or "some examples" etc., mean that specific features, structures, materials or characteristics described with reference to the embodiment(s) or example(s) are comprised in at least one embodiment or example of this disclosure. Therefore, schematic descriptions with respect to the above expressions are not necessarily directed at the same embodiments or examples herein. On the contrary, the described specific features, structures, materials or characteristics can be combined in any one or more embodiments or examples in a suitable manner. Besides, where no contradiction is introduced, those skilled in the art can incorporate and combine different embodiments or examples described in this specification, and incorporate and combine features of different embodiments or examples.

For clarity, some techniques, structures and materials commonly known in the art to which the present disclosure pertains are not described in detail to avoid redundancy of the present application.

Referring to FIG. 1, part of a special-shaped touch array baseplate 1 in the prior art is shown schematically. The touch array baseplate 1 has an R corner and a groove. When the touch function is integrated in the touch array baseplate 1 by using FIC techniques, the touch array baseplate 1 comprises a plurality of touch electrodes 20 arranged in an array. At special-shaped positions of the touch array baseplate 1 where the R corner and the groove are located, the touch electrode 20 has an irregular shape, while at other non-special-shaped positions, the touch electrode 20 has a regular shape, e.g., of a rectangle.

Figure 2:
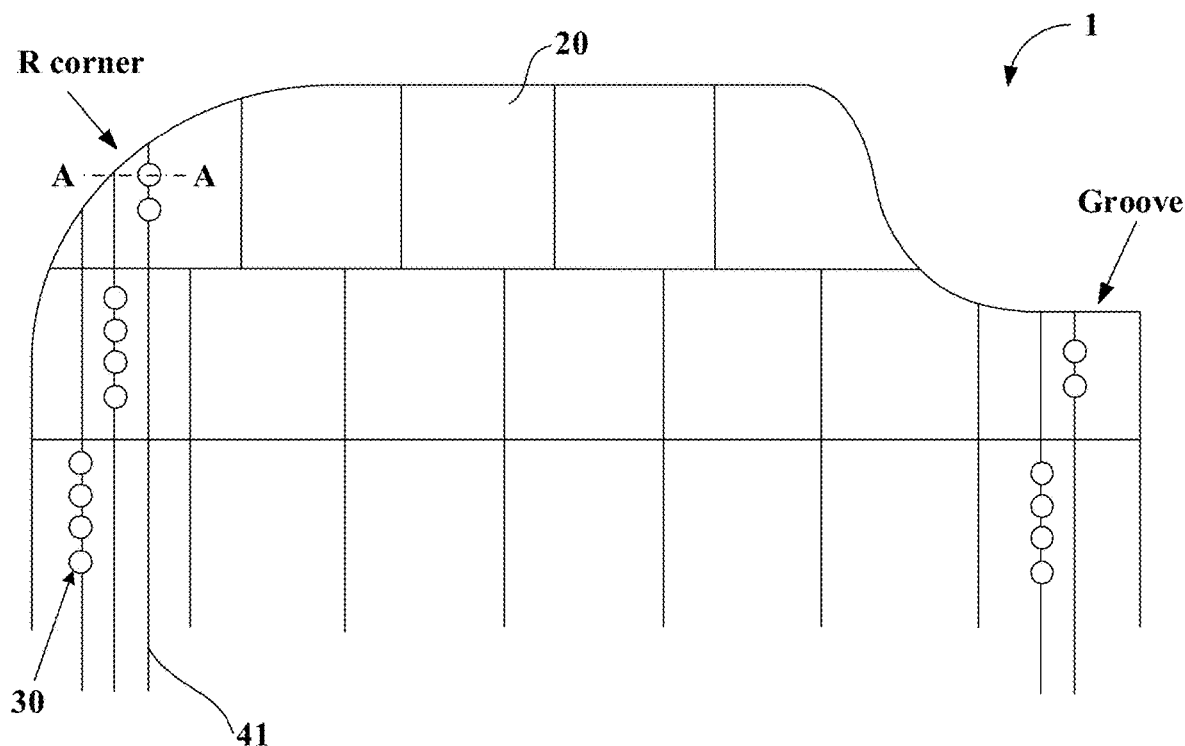
FIG. 2 schematically shows the connection of the touch electrodes with the touch electrode lines in the special-shaped touch array baseplate of FIG. 1.
Figure 3:
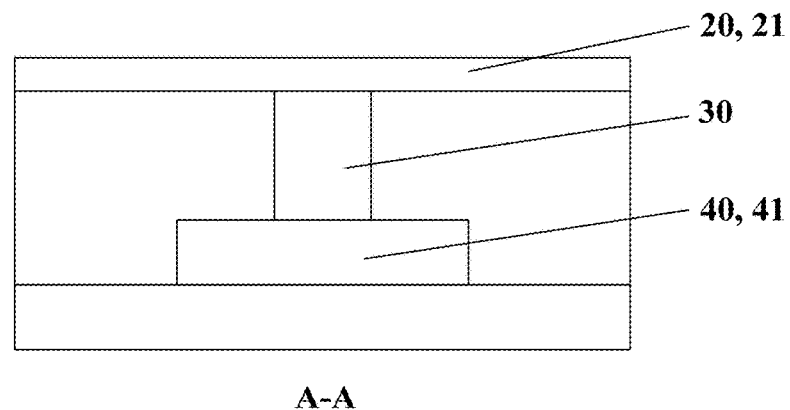
FIG. 3 is a schematic section view of a portion of the special-shaped touch array baseplate of FIG. 2 comprising touch electrodes and touch electrode lines, taken along line A-A in FIG. 2.

Turning to FIG. 2, the connection of the touch electrodes 20 with the touch electrode lines 41 in the touch array baseplate 1 of FIG. 1 are shown schematically. As shown in FIG. 2, the touch array baseplate 1 comprises a plurality of touch electrode lines 41 parallel with each other. The touch electrode lines 41 correspond to the touch electrodes 20 one by one, and are used for providing driving signals to each touch electrode 20 and receiving sensing signals from the touch electrodes 20. The touch electrodes 20 are electrically connected to the touch electrode lines 41 through first via holes 30. Besides, the touch electrode lines 41 extend from one side of the touch array baseplate 1 to the other side to electrically connect to a touch IC, thereby transmitting the driving signals outputted from the touch IC to the touch electrodes 20 and transmitting the sensing signals sensed by the touch electrodes 20 to the touch IC. Referring to FIG. 3, the film layer structure of the touch array baseplate 1 is shown schematically in the form of a section view of a portion of the special-shaped touch array baseplate 1 comprising a touch electrode 20 and a touch electrode line 41, taken along line A-A in FIG. 2. As shown in FIG. 3, the touch electrode 20 is located in the touch electrode layer 21, and the touch electrode layer 21 is patterned to form a plurality of touch electrodes 20 arranged in an array; the touch electrode line 41 is located in a first electrically conductive layer 40, and the first electrically conductive layer 40 is patterned to form a plurality of touch electrode lines 41, and the first via hole 30 is used for electrically connecting the touch electrode line 41 with the touch electrode 20.

Continuously referring to FIG. 2, as compared with the non-special-shaped positions, at the special-shaped positions of the R corner and the groove, due to limited space, the number of the first via holes 30 for electrically connecting the touch electrode line 41 with the touch electrode 20 is relatively small. As a result, the contact resistance between the touch electrode line 41 and the touch electrode 20 is increased, so that the touch load rises, which obviously differs from the touch loads at the non-special-shaped positions and in turn leads to touch and/or display defects. Moreover, since the touch load is relatively high, when a signal transition on a data line is coupled to the touch electrode 20 in an instant, it will be difficult for a signal on the touch electrode 20 to return to a preset value, thereby affecting the display.

It should be noted that FIG. 2 only schematically shows the touch electrode lines 41 connected to part of the touch electrodes 20. Besides, those skilled in the art should appreciate that adjacent touch electrodes 20 are insulated from each other, i.e., there is a gap between adjacent touch electrodes 20, which gap is not shown in FIG. 1 and FIG. 2.

In addition, in the prior art, for some regular touch array baseplates (i.e., non-special-shaped touch array baseplates) having a low resolution and a large pixel pitch, the number of corresponding pixel units in the region of each touch electrode 20 is relatively small, so the number of the first via holes 30 electrically connecting the touch electrode line 41 with the touch electrode 20 is relatively small (this is because the arrangement of the first via holes 30 has a certain rule, which is related to the number of the pixel units), and thus the touch load is relatively high. When a signal transition on a data line is coupled to the touch electrode 20 in an instant, it will be difficult for a signal on the touch electrode 20 to return to a preset value, thereby affecting the display.

Figure 4:
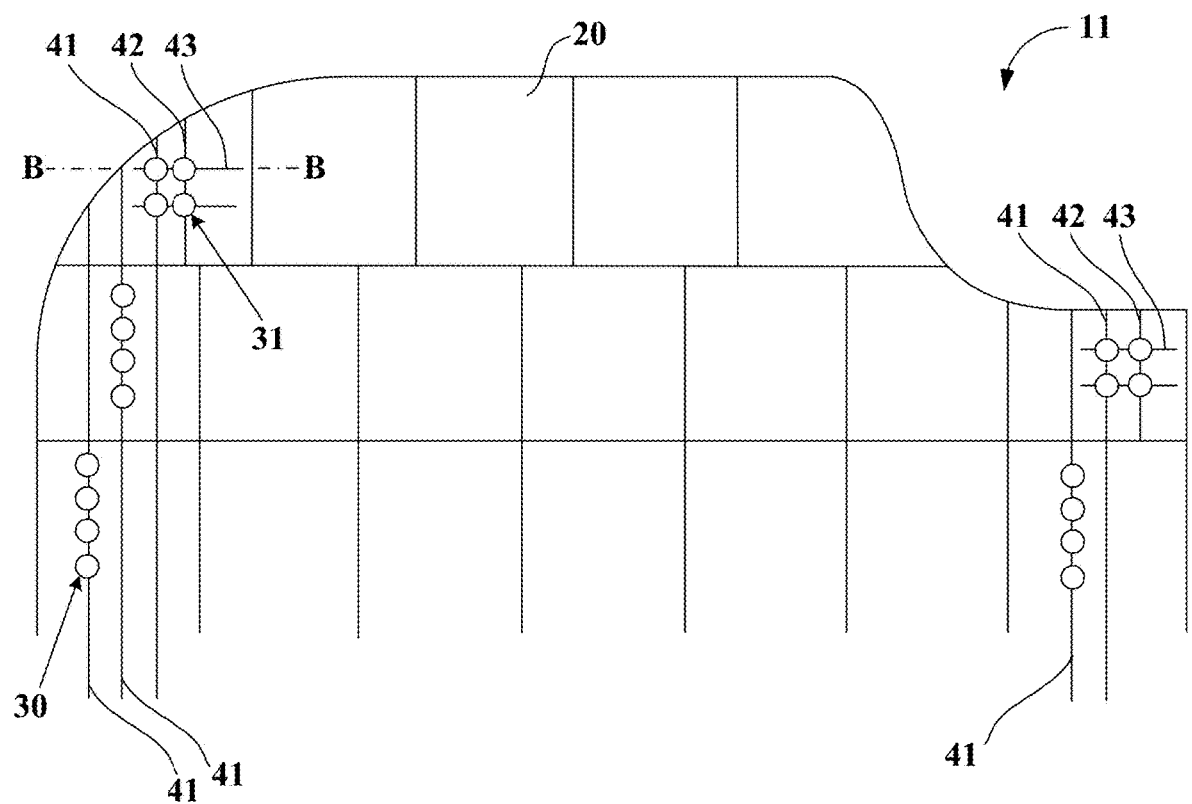
FIG. 4 schematically shows a touch array baseplate according to some exemplary embodiments of this disclosure, wherein the connection of the touch electrodes with the touch electrode lines and the virtual touch electrode lines is shown.

Now referring to FIG. 4, a touch array baseplate 11 according to some exemplary embodiments of this disclosure is shown schematically. As shown in FIG. 4, the touch array baseplate 11 comprises: a plurality of touch electrodes 20 arranged in an array; touch electrode lines 41 corresponding to the touch electrodes 20 one by one, and each touch electrode 20 being electrically connected to a corresponding touch electrode line 41 through first via holes 30, wherein the plurality of touch electrode lines 41 are parallel with each other and extend in a first direction. Besides, at the special-shaped positions of the touch array baseplate 11 where the R corner and the groove are located, virtual touch electrode lines 42 connected to the touch electrodes 20 are further comprised, the virtual touch electrode lines 42 being electrically connected to the touch electrode 20 through second via holes 31. A connection line 43 is used for electrically connecting a touch electrode line 41 and a virtual touch electrode line 42 which are electrically connected to a same touch electrode 20. As described below, in some embodiments of this disclosure, a touch electrode 20 may correspond to more than one virtual touch electrode line 42, and the connection line 43 does not necessarily connect all virtual touch electrode lines 42. It should be understood that in each exemplary embodiment of this disclosure, none of the virtual touch electrode lines 42 is connected to the touch IC.

Figure 5:
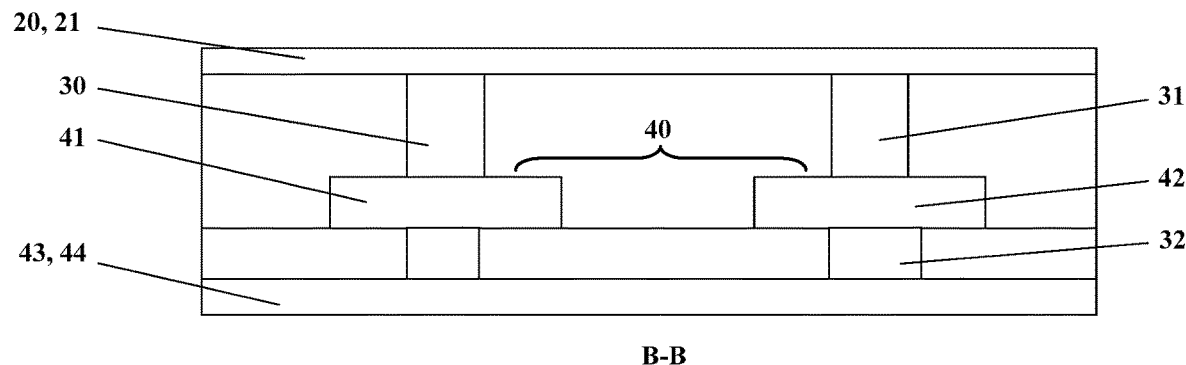
FIG. 5 is a schematic section view of a portion of the touch array baseplate of FIG. 4 comprising touch electrodes and touch electrode lines, taken along line B-B in FIG. 4.

With reference to FIG. 5, the film layer structure of the touch array baseplate 11 is shown schematically in the form of a section view of a portion of the special-shaped touch array baseplate 11 comprising a touch electrode 20, a touch electrode line 41, a virtual touch electrode line 42 and connection lines 43, taken along line B-B in FIG. 4. As shown in FIG. 5, the touch electrode 20 is located in the touch electrode layer 21, which is patterned to form a plurality of touch electrodes 20 arranged in an array. The touch electrode line 41 is located in the first electrically conductive layer 40, which is patterned to form a plurality of touch electrode lines 41, and the first via hole 30 is used for electrically connecting the touch electrode line 41 with the touch electrode 20. The first electrically conductive layer 40 further comprises the virtual touch electrode line 42, which is electrically connected to the touch electrode 20 via the second via hole 31. The connection line 43 is located in the second electrically conductive layer 44 and electrically connects the touch electrode line 41 with the virtual touch electrode line 42 through third via holes 32.

It should be understood that, the film layer structure of the touch array baseplate according to the exemplary embodiments of this disclosure may further comprise other film layers, and these film layers may have any suitable structure and arrangement known in the prior art. The structure and arrangement of these film layers will not be described in the present application for simplicity and clarity.

Besides, with reference to FIG. 4 and FIG. 5, it can be easily understood that in the first electrically conductive layer 40, the virtual touch electrode line 42 is only located within an orthogonal projection of the corresponding touch electrode 20 on the first electrically conductive layer 40, and it is not connected with the touch IC; similarly, in the second electrically conductive layer 44, the connection line 43 is only located within an orthogonal projection of the corresponding touch electrode 20 on the second electrically conductive layer 44. Therefore, the virtual touch electrode lines 42 corresponding to adjacent touch electrodes 20 are disconnected from each other, and the connection lines 43 corresponding to adjacent touch electrodes 20 are also disconnected from each other. As can be known from the above description, for the special-shaped touch array baseplate 1 shown in FIG. 2, the number of the first via holes 30 connecting the touch electrodes 20 with the touch electrode lines 41 at the special-shaped position is relatively small, which gives rise to the problem of a high touch load at this position. For a regular touch array baseplate having a low resolution and a large pixel pitch, since the number of the first via holes 30 connecting the touch electrode 20 and the touch electrode line 41 is relatively small in the region of each touch electrode, there is also the problem of a high touch load. To solve the problem of a high touch load, it is necessary to increase the number of the first via holes 30. Therefore, in the exemplary embodiments shown in FIG. 4 and FIG. 5, based on the electrical connection of the touch electrode lines 41 with the touch electrodes 20 through the first via holes 30, in a region where the number of the first via holes 30 is relatively small (i.e., in a region where the number of the first via holes 30 needs to be increased, e.g., a region with an R corner and/or a groove), the virtual touch electrode lines 42 are connected with the touch electrode 20 through additional second via holes 30 such that the number of via holes electrically connected with the touch electrodes 20 in this region is the sum of the number of the first via holes 30 electrically connecting the touch electrode lines 41 with the touch electrodes 20 and the number of the second via holes 31 electrically connecting the touch electrodes 20 with the virtual touch electrode lines 42 connected to the touch electrode lines 41 by means of the connection lines 43, thereby increasing the number of via holes connected with the touch electrodes 20 in this region.

Figure 6:
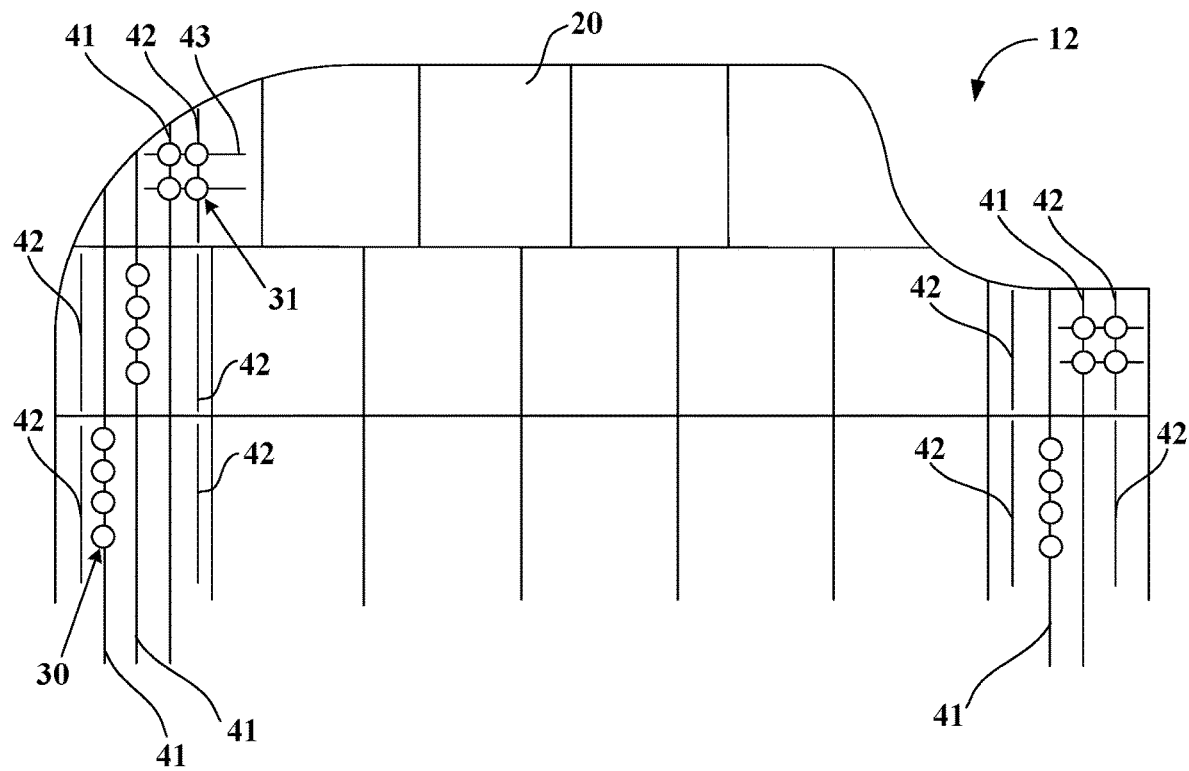
FIG. 6 schematically shows a touch array baseplate according to some other exemplary embodiments of this disclosure, wherein the connection of the touch electrodes with the touch electrode lines and the virtual touch electrode lines is shown.

Referring to FIG. 6, a touch array baseplate 12 according to some other exemplary embodiments of this disclosure is shown. As compared with the touch array baseplate 11 shown in FIG. 4, the touch array baseplate 12 differs only in: apart from touch electrodes 20 located at the special-shaped positions, touch electrodes 20 located at the non-special-shaped positions may also correspond to the virtual touch electrode lines 42; of course, the touch electrodes 20 located at the non-special-shaped positions may be electrically disconnected from the virtual touch electrode lines 42. Besides, as shown in FIG. 6, a touch electrode 20 may correspond to more than one virtual touch electrode line 42. Therefore, the connection line 43 may be only electrically connected to a virtual touch electrode line 42 electrically connected to the touch electrode 20, without being electrically connected to a virtual touch electrode line 42 electrically disconnected from the touch electrode 20.

Figure 7:
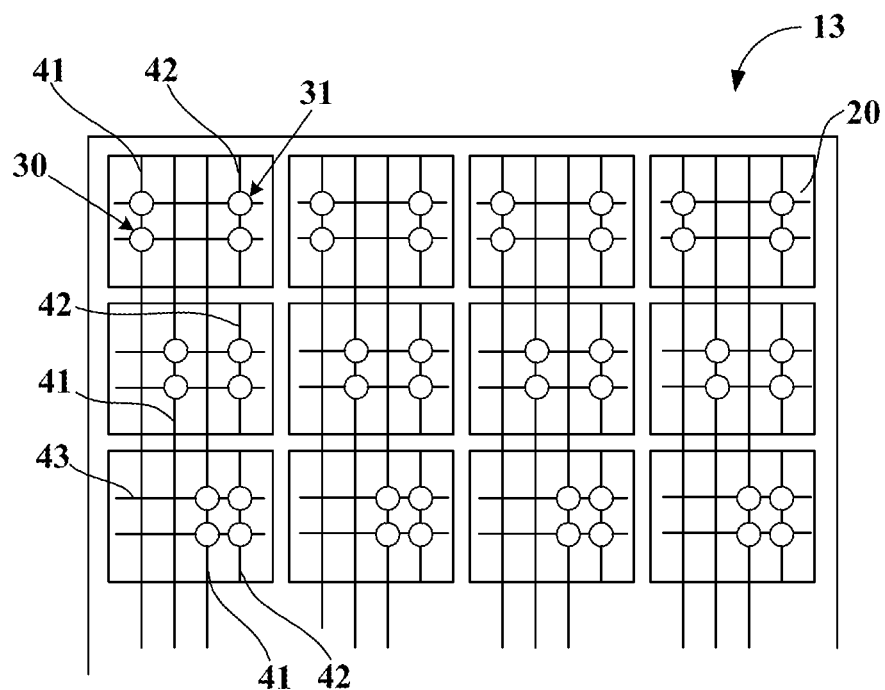
FIG. 7 schematically shows a touch array baseplate according to some further exemplary embodiments of this disclosure, wherein the connection of the touch electrodes with the touch electrode lines and the virtual touch electrode lines is shown.

Referring to FIG. 7, a touch array baseplate 13 according to some further exemplary embodiments of this disclosure is shown. The touch array baseplate 13 has a regular shape (e.g., there is no R corner or groove), but due to a low resolution, it has a large pixel pitch. The touch array baseplate 13 comprises: a plurality of touch electrodes 20 arranged in an array; touch electrode lines 41 corresponding to the touch electrodes 20 one by one and electrically connected thereto, wherein the touch electrodes 20 are electrically connected to the touch electrode lines 41 through first via holes 30, and the touch electrode lines 41 are parallel with each other. Moreover, the touch array baseplate 13 further comprises virtual touch electrode lines 42 and connection lines 43 corresponding to each touch electrode 20, wherein the virtual touch electrode lines 42 are electrically connected to the touch electrodes 20 through second via holes 31, and the connection lines 43 electrically connect the touch electrode lines 41 with the virtual touch electrode lines 42 through third via holes. Therefore, for each touch electrode 20, the number of via holes electrically connected thereto is the sum of the number of the first via holes 30 electrically connecting the touch electrode line 41 with the touch electrode 20 and the number of the second via holes 31 electrically connecting the touch electrode 20 with the virtual touch electrode line 42 electrically connected to the touch electrode line 41 by means of the connection lines 43, thereby increasing the number of via holes connected with the touch electrodes 20 in this region.

It should be pointed out that, the electrical connection of the touch electrodes 20, the touch electrode lines 41, the virtual touch electrode lines 42 and the connection lines 43 is achieved respectively by means of the first via holes 30, the second via holes 31 and the third via holes 32 in the touch array baseplates 12 and 13 as shown in FIG. 6 and FIG. 7 in the same way as it is shown in FIG. 5, which will not be repeated for simplicity. Besides, in the touch array baseplates 11, 12 and 13 as shown in FIG. 4, FIG. 6 and FIG. 7, the sum number of the first via holes 30 and the second via holes 31 electrically connecting the touch electrode line 41 and the virtual touch electrode line 42 with one touch electrode 20 is the same for all of electrodes 20, wherein the virtual touch electrode line 42 is electrically connected to the touch electrode line 41 by means of connection lines 43. As shown in the drawings, the number of via holes electrically connected to each of the touch electrodes 20 is four. However, the number of via holes electrically connecting the touch electrode lines 41 and the virtual touch electrode line 42 with one touch electrode 20 (the via holes are the first via holes 30 connected to the touch electrode line 41 electrically connected to a touch electrode 20 and the second via holes 31 connected to the virtual touch electrode line 42 electrically connected to the touch electrode line 41 by means of the connection lines 43) may also be different for different touch electrodes 20, wherein the virtual touch electrode line 42 is electrically connected to the touch electrode line 41 by means of the connection lines 43. For example, the difference between the numbers of the via holes may be set to be smaller than or equal to a first threshold value. Therefore, the number of the first via holes 30 and the second via holes 31 electrically connecting the touch electrode line 41 and the virtual touch electrode line 42 with each of the touch electrodes 20 can be made substantially identical, wherein the virtual touch electrode line 42 is electrically connected to the touch electrode line 41 by means of the connection lines 43, so that the problem of a high touch load caused by few via holes can be solved and the touch and/or display defects resulting therefrom can be eliminated.

Based on that, it can be understood that, for a product using a special-shaped touch panel, only at an special-shaped position region where the number of via holes needs to be increased, based on the electrical connection of the touch electrode lines 41 with the touch electrodes 20 through the first via holes 30, the virtual touch electrode lines 42 may be further electrically connected to the touch electrodes 20 through additional second via holes 31; at other non-special-shaped regions, only the touch electrode lines 41 may be electrically connected to the touch electrodes 20 through the first via holes 30. Besides, for a product using a regular touch panel having a low resolution and a large pixel pitch, in any region of the touch electrodes 20, based on the electrical connection of the touch electrode lines 41 with the touch electrodes 20 through the first via holes 30, the virtual touch electrode lines 42 may be further electrically connected to the touch electrodes 20 through additional second via holes 31.

Figure 8:
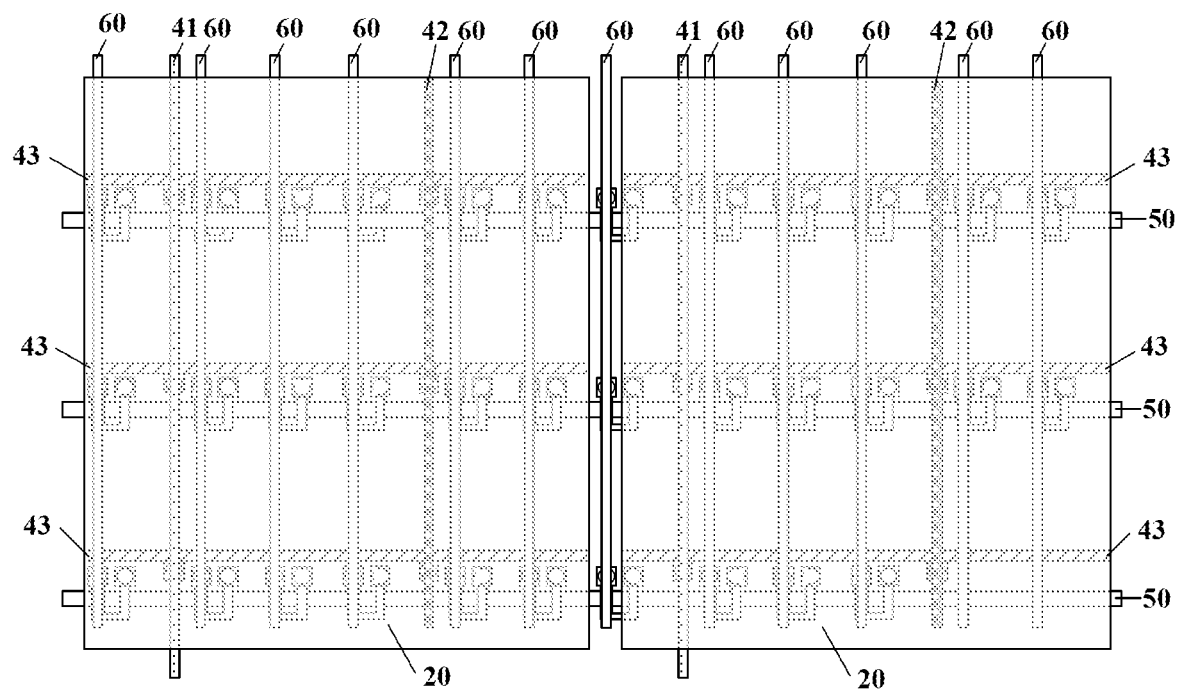
FIG. 8 shows details of the connection of the touch electrodes with the touch electrode lines and the virtual touch electrode lines in two touch electrodes.

Referring to FIG. 8, details of the connection of two touch electrodes 20 with the touch electrode lines 41 and the virtual touch electrode lines 42 in regions of the two touch electrodes 20 are shown schematically. The regions of the two electrodes 20 both comprise a touch electrode line 41 and a virtual touch electrode line 42, and the touch electrode line 41 and the virtual touch electrode line 42 are electrically connected with each other by means of connection lines 43. In other words, each touch electrode 20 is electrically connected to a touch electrode line 41 and a virtual touch electrode line 42, and the touch electrode line 41 and the virtual touch electrode line 42 are electrically connected with each other by means of connection lines 43. It should be noted that when the touch electrode line 41 and the virtual touch electrode line 42 are electrically connected by means of connection lines 43, different touch electrodes 20 correspond to different connection lines 43 so as to ensure that for each touch electrode 20, the corresponding touch electrode line 41 and virtual touch electrode line 42 are electrically connected, but are not electrically connected to the touch electrode line 41 and the virtual touch electrode line 42 of a different touch electrode 20.

It should be noted that FIG. 8 only schematically shows the regions of two touch electrodes 20 and the electrical connection between the corresponding touch electrode lines 41, virtual touch electrode lines 42 and connection lines 43, but it does not show the first via holes 30, the second via holes 31 and the third via holes 32. The arrangement of the first via holes 30, the second via holes 31 and the third via holes 32 has been described in detail above, which will not be repeated herein for simplicity.

In the exemplary embodiments of this disclosure, for any touch electrode 20, by electrically connecting it with the touch electrode line 41 and the virtual touch electrode line 42 and electrically connecting the touch electrode line 41 with the virtual touch electrode line 42 by means of the connection line(s) 43, not only the touch load can be reduced, but also the wiring of the display region can be more homogenized.

In addition, as shown in FIG. 8, the regions of the touch electrodes 20 further comprise a plurality of data lines 60 parallel with each other and a plurality of gate lines 50 parallel with each other. The touch electrode lines 41 and the virtual touch electrode lines 42 may extend in an extending direction of the data lines 60; the connection lines 43 may extend in an extending direction of the gate lines 50. The extending direction of the data lines 60 intersects the extending direction of the gate lines 50. In some exemplary embodiments of this disclosure, the extending direction of the data lines 60 is perpendicular to that of the gate lines 50. There are a plurality of connection lines 43 for electrically connecting a touch electrode line 41 and a virtual touch electrode line 42, and each is arranged close to a gate line 50 so as to further improve the homogeneity of the wiring.

Optionally, the connection lines 43 are arranged on the same layer as the gate lines 50, and the orthogonal projections of the connection lines 43 on the substrate fall within an orthogonal projection of a black matrix on the substrate. By arranging the connection lines 43 on the same layer as the gate lines 50, the connection lines 30 and the gate lines 50 can be formed by one and the same patterning process. Therefore, although the connection lines 43 are added, the number of patterning processes will not be increased. Besides, the connection lines 43 are arranged such that the orthogonal projections thereof on the substrate fall within an orthogonal projection of a black matrix on the substrate, which avoids affecting the normal display.

Optionally, the touch electrode lines 41 and the virtual touch electrode lines 42 may be arranged on the same layer as the data lines 60, which can also avoid increasing the number of patterning processes.

Figure 9:
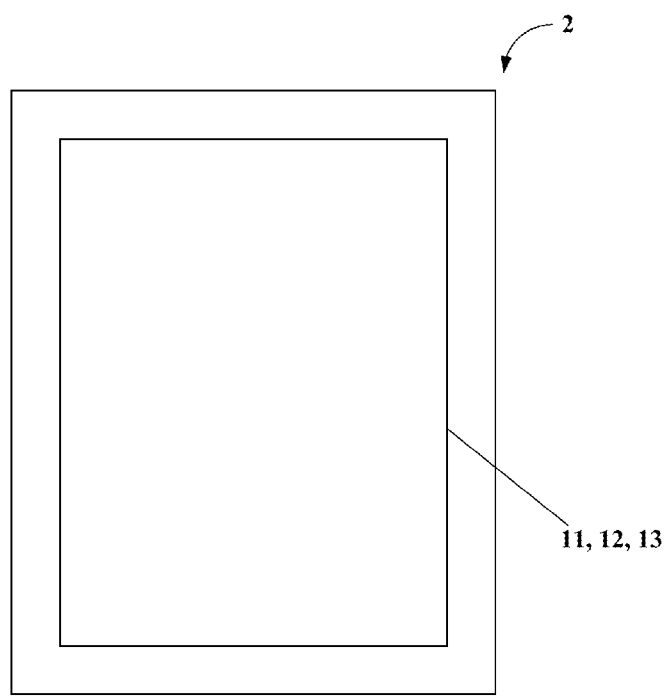
FIG. 9 schematically shows a touch panel according to some exemplary embodiments of this disclosure.

Referring to FIG. 9, a touch panel 2 according to some exemplary embodiments of this disclosure is shown, the touch panel 2 comprising the above touch array baseplate 11, 12, 13. Therefore, the touch panel 2 according to the exemplary embodiments of this disclosure has the same beneficial effects as the above touch array baseplate 11, 12, 13, which will not be repeated herein for simplicity.

In some exemplary embodiments of this disclosure, the touch panel 2 may be a special-shaped panel or a low display resolution touch panel having a resolution below 1080× 1800.

Figure 10:
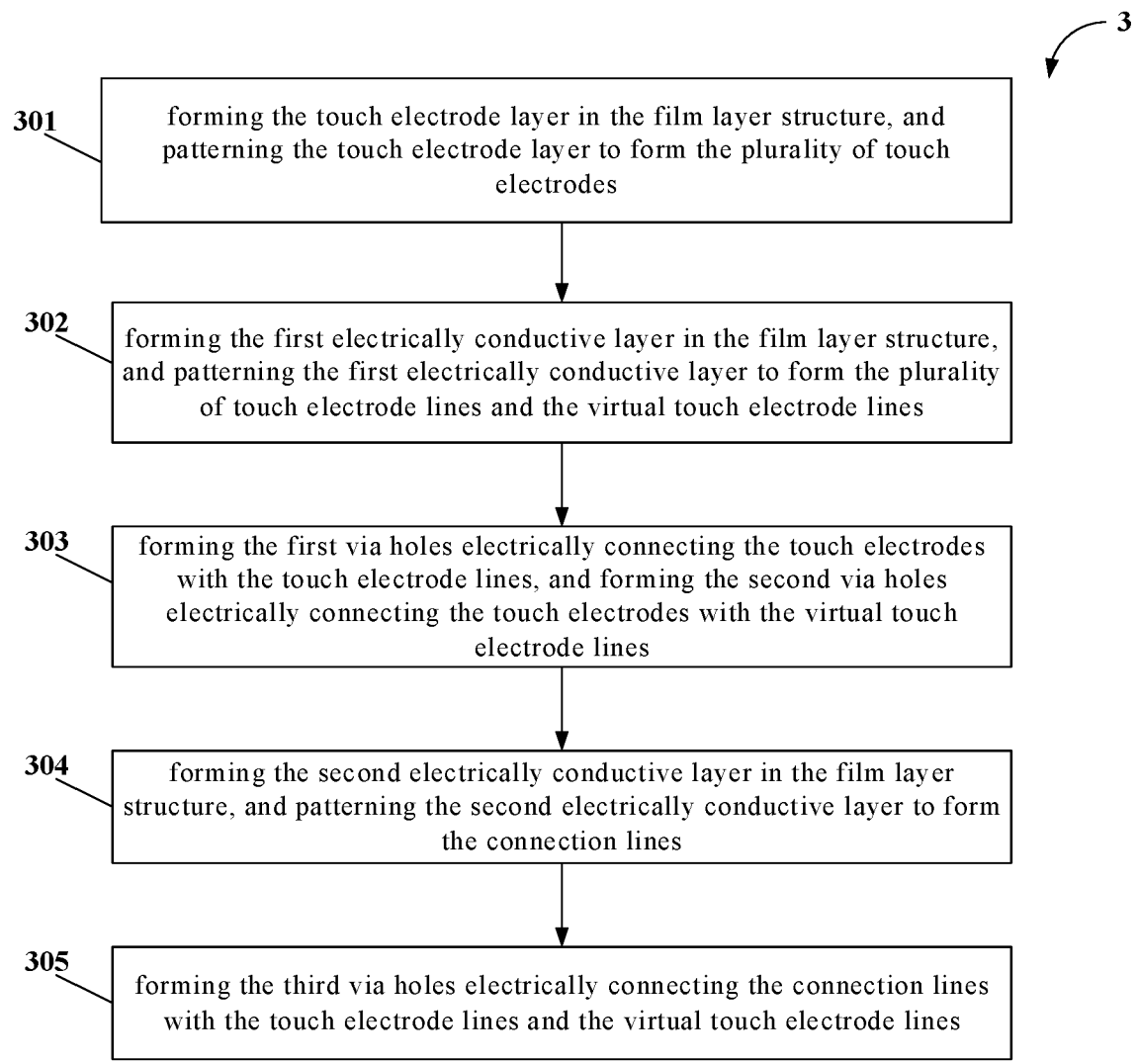
FIG. 10 schematically shows a manufacturing method for manufacturing a touch array baseplate according to some exemplary embodiments of this disclosure.

Now returning to FIG. 10, a manufacturing method 3 for manufacturing the touch array baseplate 11, 12, 13 according to some exemplary embodiments of this disclosure is shown schematically. It should be pointed out that the steps in the method described below are all exemplary, and they do not have to be executed in the listed sequence, but instead, one or some of the steps can be executed in a different sequence or simultaneously depending upon actual conditions. Besides, other additional steps may also be comprised depending upon actual conditions.

The manufacturing method 3 comprises the following steps:

Step 301: forming a touch electrode layer 21 in the film layer structure of the touch array baseplate 11, 12, 13, and patterning the touch electrode layer 21 to form a plurality of touch electrodes 20 arranged in an array;

Step 302: forming a first electrically conductive layer 40 in the film layer structure, and patterning the first electrically conductive layer 40 to form a plurality of touch electrode lines 41 and virtual touch electrode lines 42;

Step 303: forming first via holes 30 to electrically connect the touch electrodes 20 with the touch electrode lines 41, and forming second via holes 31 to electrically connect the touch electrodes 20 with the virtual touch electrode lines 42;

Step 304: forming a second electrically conductive layer 44 in the film layer structure, and patterning the second electrically conductive layer 44 to form connection lines 43; and Step 305: forming third via holes 32 to electrically connect the connection lines 43 with the touch electrode lines 41 and the virtual touch electrode lines 42.

According to some other exemplary embodiments of this disclosure, the step 302 of the manufacturing method 3 further comprises patterning the first electrically conductive layer 40 to form a plurality of data lines 60. The data lines 60, the touch electrode lines 41 and the virtual touch electrode lines 42 all extend in a first direction. Besides, according to some further exemplary embodiments of this disclosure, the step 304 of the manufacturing method 3 further comprises patterning the second electrically conductive layer 44 to form a plurality of gate lines 50. The connection lines 43 and the gate lines 50 both extend in a second direction, the second direction being arranged to intersect the first direction, and each of the connection lines 43 is arranged close to a corresponding gate line 50.

It should be understood that, the touch electrode layer 21, the first electrically conductive layer 40, the second electrically conductive layer 44, the first via holes 30, the second via holes 31 and the third via holes 32 may be fabricated by using any suitable process known in the prior art. Besides, the film layer structure of the touch array baseplate 11, 12, 13 according to this disclosure may further comprise other film layers, and these film layers may have any suitable structure and arrangement known in the prior art and be fabricated by using any suitable method known in the prior art. The manufacturing method of these film layers will not be described in the present application for simplicity and clarity.

What is discussed above is only illustration and description of the exemplary embodiments of this disclosure, but the illustration and description should be considered as illustrative and schematic, and the scope of this disclosure is not limited thereto. Any skilled person who is familiar with this technical field can easily conceive of various variations or substitutions based on the teaching of this disclosure, and these variations or substitutions should all be deemed as falling within the protection scope of this disclosure. Therefore, the protection scope of the present invention shall be subject to the appended claims.

The invention claimed is:

1. A touch array baseplate, comprising:
   a substrate;
   a film layer structure, formed on the substrate and comprising:
   a touch electrode layer, comprising a plurality of touch electrodes arranged in an array;
   a first electrically conductive layer, comprising:
   a plurality of touch electrode lines, the plurality of touch electrode lines corresponding to the plurality of touch electrodes one by one, and each touch electrode line being electrically connected to a corresponding touch electrode through a first via hole;
   a virtual touch electrode line connected to at least one of the plurality of touch electrodes, the virtual touch electrode line being electrically connected to a corresponding touch electrode through a second via hole, wherein the virtual touch electrode line is located within an orthogonal projection of the touch electrode connected thereto on the first electrically conductive layer;
   a second electrically conductive layer, comprising connection lines, with a connection line electrically connecting, through third via holes, a touch electrode line and a virtual touch electrode line which are electrically connected to a same touch electrode, wherein the connection line is located within an orthogonal projection of a corresponding touch electrode on the second electrically conductive layer;
   wherein the touch electrode layer, the first electrically conductive layer and the second electrically conductive layer are isolated from each other by insulating layers.

2. The touch array baseplate according to claim 1, wherein the touch electrode lines and the virtual touch electrode line both extend in a first direction.

3. The touch array baseplate according to claim 2, wherein the connection lines extend in a second direction, and the second direction and the first direction intersect each other.

4. The touch array baseplate according to claim 3, wherein the second electrically conductive layer further comprises a plurality of gate lines parallel with each other, and the gate lines extend in the second direction.

5. The touch array baseplate according to claim 4, wherein each connection line is arranged close to a gate line correspondingly.

6. The touch array baseplate according to claim 5, wherein the film layer structure further comprises a black matrix, and orthogonal projections of the connection lines on the substrate fall within an orthogonal projection of the black matrix on the substrate.

7. The touch array baseplate according to claim 3, wherein the first electrically conductive layer further comprises a plurality of data lines parallel with each other, and the data lines extend in the first direction.

8. The touch array baseplate according to claim 7, wherein the second electrically conductive layer further comprises a plurality of gate lines parallel with each other, and the gate lines extend in the second direction.

9. The touch array baseplate according to claim 8, wherein each connection line is arranged close to a gate line correspondingly.

10. The touch array baseplate according to claim 2, wherein the first electrically conductive layer further comprises a plurality of data lines parallel with each other, and the data lines extend in the first direction.

11. The touch array baseplate according to claim 1, wherein the touch electrode lines extend from one side of the touch array baseplate to the other side opposite thereto.

12. The touch array baseplate according to claim 1, wherein each of the plurality of touch electrodes is connected to at least one virtual touch electrode line.

13. The touch array baseplate according to claim 1, wherein for the plurality of touch electrodes, a difference between numbers of active via holes electrically connected to one touch electrode is smaller than or equal to a first threshold value, the active via holes being the first via holes connected to the touch electrode line electrically connected to the one touch electrode and the second via holes connected to the virtual touch electrode line electrically connected to the touch electrode line by means of the connection line.

14. The touch array baseplate according to claim 13, wherein for the plurality of touch electrodes, the numbers of the active via holes electrically connected to one touch electrode are the same.

15. A touch panel, the touch panel comprising the touch array baseplate according to claim 1.

16. The touch panel according to claim 15, wherein the touch panel is a special-shaped panel or a touch panel having a resolution below 1080×1800.

17. A manufacturing method for manufacturing the touch array baseplate according to claim 1, comprising steps of:
   a) forming the touch electrode layer in the film layer structure, and patterning the touch electrode layer to form the plurality of touch electrodes;
   b) forming the first electrically conductive layer in the film layer structure, and patterning the first electrically conductive layer to form the plurality of touch electrode lines and the virtual touch electrode lines;
   c) forming the first via holes electrically connecting the touch electrodes with the touch electrode lines, and forming the second via holes electrically connecting the touch electrodes with the virtual touch electrode lines;
   d) forming the second electrically conductive layer in the film layer structure, and patterning the second electrically conductive layer to form the connection lines;
   e) forming the third via holes electrically connecting the connection lines with the touch electrode lines and the virtual touch electrode lines.

18. The manufacturing method according to claim 17, wherein step b) further comprises: patterning the first electrically conductive layer to form a plurality of data lines.

19. The manufacturing method according to claim 18, wherein step d) further comprises: patterning the second electrically conductive layer to form a plurality of gate lines.

20. The manufacturing method according to claim 17, wherein step d) further comprises: patterning the second electrically conductive layer to form a plurality of gate lines.

* * * * *